Feb. 5, 1924.

J. C. WHITED 1,482,669

NUT LOCK

Filed July 9, 1923

Inventor
John C. Whited
By Watson E. Coleman
Attorney

Patented Feb. 5, 1924.

1,482,669

UNITED STATES PATENT OFFICE.

JOHN C. WHITED, OF CREEDE, COLORADO.

NUT LOCK.

Application filed July 9, 1923. Serial No. 650,367.

*To all whom it may concern:*

Be it known that I, JOHN C. WHITED, a citizen of the United States, residing at Creede, in the county of Mineral and State of Colorado, have invented certain new and useful Improvements in Nut Locks, of which the following is a specification, reference being had to the accompanying drawings.

This invention relates to nut locks, and particularly to that variety of nut lock wherein a pawl is used carried by the nut and engaging the work.

The object of my invention is to provide a nut lock of this character which is very simple, which may be easily applied, and which requires very little modification of the standard nut.

Other objects will appear in the course of the following description.

My invention is illustrated in the accompanying drawings, wherein:—

Figure 1:
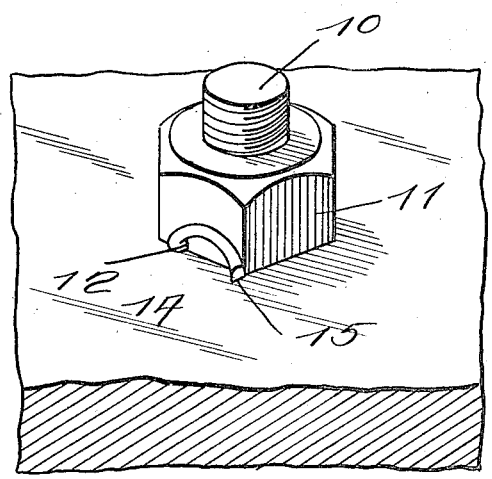
Figure 1 is a perspective view showing my improved nut and nut locking device in applied position.
Figure 2:
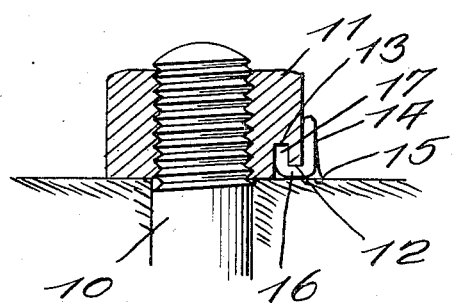
Figure 2 is a vertical sectional view through the nut and the work, the bolt being in elevation and showing my nut lock.
Figure 3:
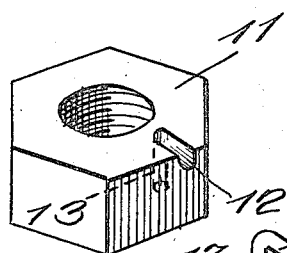
Figure 3 is a perspective view looking at the work engaging face of the nut, the locking pawl being removed, and also showing the locking pawl separated from the nut.

Referring to these drawings, 10 designates a bolt and 11 the nut thereof. This nut is shown as a hexagonal nut but I do not wish to be limited to this, as it is obvious that it might be made of any desired form. That face of the nut which is designed to confront the work is formed with a recess 12 extending inward from one side face of the nut and also intersecting the work confronting face of the nut. This recess is intersected by a longitudinal recess 13 of relatively slight depth.

The pawl 14 is formed of a short length of wire bent to form a slightly curved body having a sharp cutting edge 15. The wire at the extremity of the curved body opposite the cutting edge 15 is bent in a plane at right angles to the plane of the portion 14, as at 16, and then angularly bent, as at 17, so that this terminal portion 17 fits within the socket 13 and the portion 16 fits within the groove 12.

When this locking device is in place and the nut is turned against the work, the pointed extremity 15 of the pawl 14 will first strike the work and then as the nut is turned home the pawl will flex, due to the resilience of its material, while the point of the pawl will drag over the work. Eventually when the nut has been turned fully home, the pawl will be forced up flush with the face of the nut. Now if it be attempted to turn the nut in the opposite direction, the pawl will be forced into the work and will resist movement of the nut.

It will be understood that the point of the spring pawl 14 is to be hardened so that it will bite or catch into any softer material than this hardened extremity of the spring. It will be seen that the flexing of this pawl will not cause the spring to come out when starting the nut on the bolt. It will be also seen that the spring is on the outside of the nut so that its operation can be observed and it can be noted whether the spring pawl is actually holding or not. In making the nut the socket 13 and the groove 12 for the end of the spring pawl can be stamped or otherwise formed without weakening the nut. Of course, the nut can be removed by applying strain thereto to reversely turn it but this will not damage the spring. In case, however, the spring pawl is damaged it can be easily replaced at a slight cost.

While I have heretofore described my device as applied to a nut, it is obvious also that the device might be applied to the head of a screw with like result.

I claim:—

A device of the character described comprising a member adapted to be rotated around an axis, the member having outward of its axis a groove on the work engaging face of the member extending inward from one side face thereof, there being an axially extending socket at the end of said groove, and a locking pawl of resilient material having a curved body portion sharpened at one end and adapted to lie against the side face of the member, that extremity of the pawl remote from the sharpened end being bent at right angles to the body of the pawl to lie within said groove and having a terminal end bent to extend axially into said socket.

In testimony whereof I hereunto affix my signature.

JOHN C. WHITED.